(12) United States Patent
Wu et al.

(10) Patent No.: US 9,900,946 B2
(45) Date of Patent: Feb. 20, 2018

(54) LED DRIVER CIRCUIT

(71) Applicant: XIAMEN LEEDARSON LIGHTING GROUP CO., LTD., Xiamen (CN)

(72) Inventors: Minghao Wu, Xiamen (CN); Wenchang Huang, Xiamen (CN); Yanzeng Gao, Xiamen (CN)

(73) Assignee: XIAMEN LEEDARSON LIGHTING GROUP CO., LTD., Xiamen (CN)

( * ) Notice: Subject to any disclaimer, the term of this patent is extended or adjusted under 35 U.S.C. 154(b) by 0 days.

(21) Appl. No.: 15/227,946

(22) Filed: Aug. 3, 2016

(65) Prior Publication Data

US 2017/0311395 A1    Oct. 26, 2017

(30) Foreign Application Priority Data

Apr. 22, 2016    (CN) .......................... 2016 1 0255713

(51) Int. Cl.
    *H05B 33/08* (2006.01)
(52) U.S. Cl.
    CPC ....... *H05B 33/083* (2013.01); *H05B 33/0809* (2013.01)

(58) Field of Classification Search
    CPC .......................... H05B 33/083; H05B 33/0809
    See application file for complete search history.

(56) References Cited

U.S. PATENT DOCUMENTS

| 2010/0308738 | A1* | 12/2010 | Shteynberg | ........ | H05B 33/0812 |
| | | | | | 315/185 R |
| 2012/0091920 | A1* | 4/2012 | Yang | ................... | H05B 33/0824 |
| | | | | | 315/320 |
| 2015/0042234 | A1* | 2/2015 | Lee | .................... | H05B 33/0824 |
| | | | | | 315/193 |

* cited by examiner

*Primary Examiner* — Douglas W Owens
*Assistant Examiner* — Pedro C Fernandez
(74) *Attorney, Agent, or Firm* — Chun-Ming Shih

(57) ABSTRACT

An LED driver circuit includes a rectifying module, a control unit, and at least two LED light strings. The control unit includes a voltage input detection terminal and a switch assembly. The voltage input detection terminal is configured to detect the waveform of the voltage input. The switch assembly changes the way of connection between the LED light strings according to the waveform of the voltage input.

20 Claims, 8 Drawing Sheets

LED DRIVER CIRCUIT

FIELD OF THE INVENTION

The invention is related to the field of illumination, in particular to the field of LED driver circuit.

BACKGROUND OF THE INVENTION

LED light sources have advantages of high luminous efficiency, low heat generation, electricity saving, and long lifetime, thus having more and more widely applications. LED lights will gradually replace conventional illuminative lamps like incandescent lamps and halogen lamps. With the development of LED lights, LED lights are driven toward the trend of structural miniaturization. Common LED light driving circuits in the current market use an electrolytic capacitor for filtering after rectifications of voltage inputs, and inductors or transformers are also needed to be used in circuits. Because the large volume of electrolytic capacitors occupy a larger space of driving circuits, the driving circuits are difficult to be further miniaturized. Also, the lifetime of electrolytic capacitors is greatly influenced by ambient temperature of the space of driving circuits, making electrolytic capacitors have premature failures, resulting in the shortened lifetime of the whole light. The larger volume of inductors and transformers also results in difficulties in miniaturizing driving structures.

SUMMARY OF THE INVENTION

One objective of the invention is to provide an LED driver which does not need an electrolytic capacitor. Another objective of the invention is to provide an LED driver that can have a better power efficiency.

Still another objective of the invention is to provide an LED driver that can be easily miniaturized.

According to one aspect of the invention, an LED driver circuit is disclosed. The LED driver circuit comprises a rectifying module, a control unit, and at least two LED light strings. The rectifying module connects to the control unit to input a voltage with periodic variations to the control unit. The control unit comprises a voltage input detection terminal and a switch assembly. The voltage input detection terminal is configured to detect the waveform of the voltage input after rectification by the rectifying module. The switch assembly changes the way of connection between the LED light strings according to the waveform of the voltage input, such that the sum of currents of the LED light strings varies corresponding to the variations of the waveform of the voltage input.

According to another aspect of the invention, a control unit for an LED driver circuit is disclosed. The LED driver circuit comprises a first LED light string and a second LED light string. The control unit comprises a voltage input detection unit and a switch assembly.

The voltage input detection unit senses and detects a voltage level of an input signal. The switch assembly is connected to the voltage input detection unit. When the voltage input detection unit determines that the voltage level of the input signal is lower than a predetermined level, the switch assembly connects the first LED light string and the second LED light string in parallel. When the voltage input detection unit determines that the voltage level of the input signal is higher than the predetermined level, the switch assembly connects the first LED light string and the second LED light string in series.

According to still another aspect of the invention, an LED device is disclosed. The LED device comprises a set of LED light strings, a rectifying module, and a control unit. The rectifying module receives an input signal. The control unit is connected to the set of LED light strings. The control unit is connected to the rectifying module. The control unit outputs an output current. The output current comprises at least a portion of currents flowing through the set of LED light strings. When a voltage level of the input signal is lower than a predetermined level, the output current changes from a first current value to a second current value and at least a subset of the LED light strings are connected in parallel.

Comparing with prior arts, the LED driver circuit of the invention does not need electrolytic capacitors, inductors and transformers, but use the newly designed sectional constant current IC such that the serial/parallel relations between each LED light string can be flexibly combined and switched, and the space can thus be greatly reduced. The driving circuit is easily miniaturized and the cost be reduced. Since there is no electrolytic capacitor existing in the circuit, the hidden trouble of causing the shortened lifetime of the whole light due to premature failures of electrolytic capacitors is eliminated. Thus, the LED driver circuit has advantages of simple circuit structure and can be easily miniaturized.

DETAILED DESCRIPTION OF THE INVENTION

Figure 1:
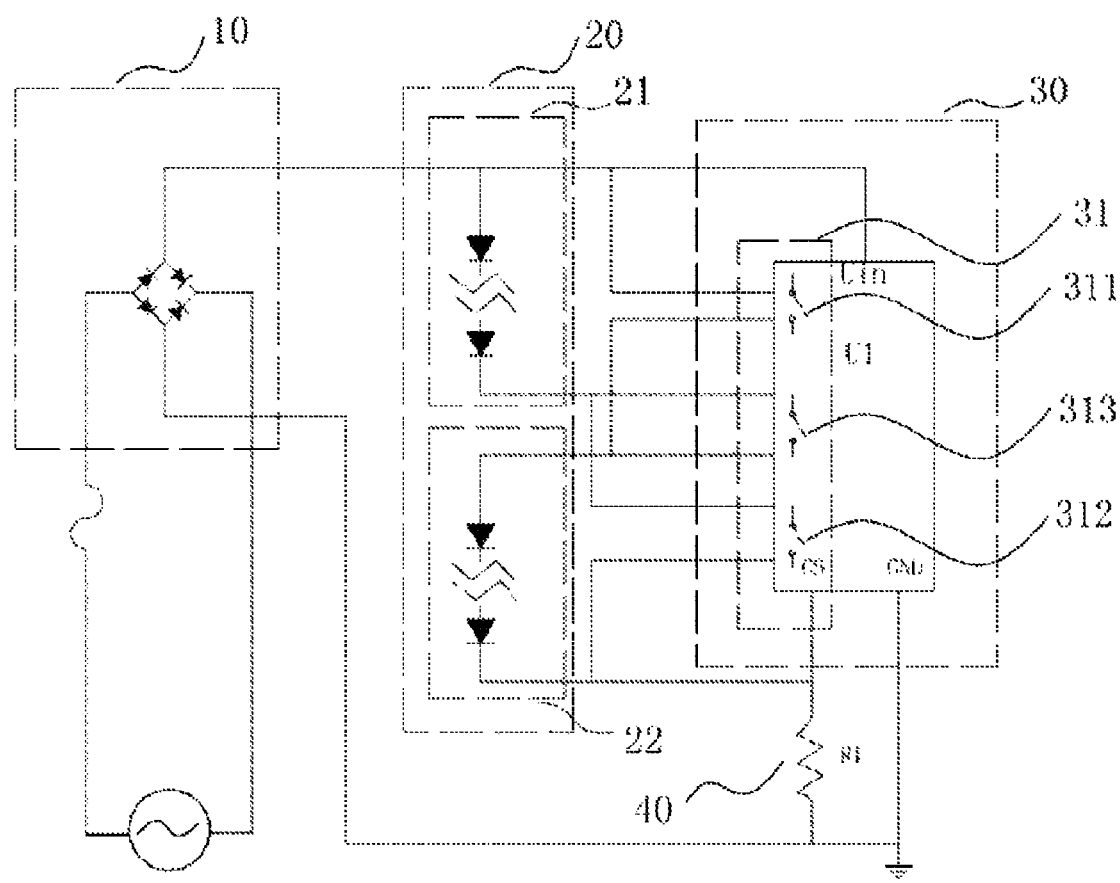
FIG. 1 is a schematic diagram of an LED driver circuit of an embodiment of the invention.

The following is a detailed description with reference to drawings. FIG. 1 is a schematic diagram of an LED driver circuit of the first embodiment of the invention. Referring to FIG. 1, the LED driver circuit 100 includes a rectifying module 10, a control unit 30 and at least two strings of LED light strings 20. The rectifying module 10 connects to the control unit 30 to input a voltage with periodic variations to the control unit 30. The control unit 30 includes a voltage input Uin detection terminal and a switch assembly 31. The voltage input Uin detection terminal is configured to detect the waveform of the voltage input Uin after rectification by the rectifying module 10.

The switch assembly 31 is connected with the LED light strings 20. The switch assembly 31 changes the way of connection between the LED light strings 20 according to the waveform of the voltage input Uin, such that the sum of currents Iout of the LED light strings 20 varies corresponding to the variations of the waveform of the voltage input Uin.

However, the variation ranges of currents of each LED light string flowing through the LED light strings 20 is smaller than the variation range of the voltage.

The periodic variations of the embodiment can be pulsating voltages from AC sine waves via diode rectifications. The voltages with periodic variations are not only limited to pulsating voltages from AC sine waves via diode rectifications, they can also be other voltages with periodic variations suitable for driving LEDs.

Figure 2:
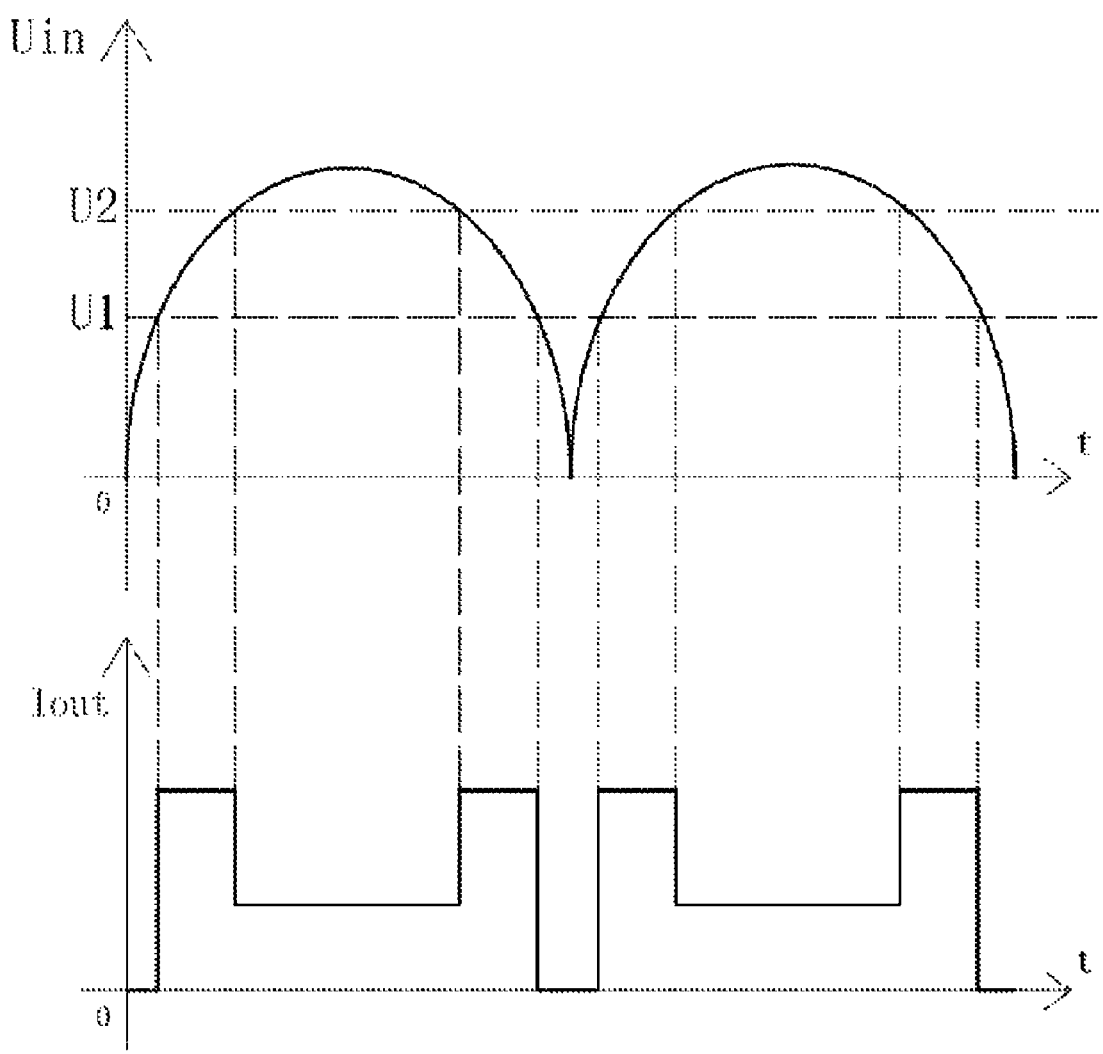
FIG. 2 is a waveform diagram of a total current of the LED light strings varying according to a voltage input.

FIG. 2 is a waveform diagram of an embodiment of the invention, illustrating the total current of the LED light strings varying according to a voltage input Uin. Referring to FIG. 1 and FIG. 2, when the voltage input Uin is lower, the switch assembly 31 connects the LED light strings 20 in parallel. When the voltage input Uin is higher, the switch assembly 31 connects the LED light strings 20 in series.

In another embodiment, when the voltage input Uin is lower, the switch assembly 31 can also short at least one LED light string 20. However, when the voltage input Uin is higher, the switch assembly 31 will connect the shorted LED light strings 20 in series.

In one embodiment, when the voltage input Uin is larger than one of the voltages of the LED light strings 20 but smaller than the sum of all the LED voltages of the LED light strings 20, the switch assembly 31 connects all of the LED light strings 20 in parallel. When the voltage input Uin is larger than the sum of all the LED voltages of the LED light strings 20, the switch assembly 31 connects all of the LED light strings 20 in series.

Referring to FIG. 1 and FIG. 2, in some embodiments, the LED light strings 20 includes a first LED light string 21 and a second LED light string 22. The voltage of a single string of LED light string is the voltage of the first LED light string 21 or the voltage of the second LED light string 22, which is represented by U1. The sum of voltages of all LED light strings is the sum of voltages of the first LED string 21 and the second LED light string 22, which is represented by U2. The sum of currents of all LED light strings 20 is represented by Iout. The switch assembly includes a first switch 311, a second switch 312, and a third switch 313.

When the voltage input Uin is larger than the LED voltage of the first LED light string 21 or the second LED light string 22 but smaller than the sum of the LED voltages of the first LED light string 21 and the second LED light string 22, that is, when U1<Uin<U2, the third switch 313 is disconnected. The first switch 311 and the second switch 312 are closed, such that the first LED light string 21 and the second LED light string 22 work in parallel.

When the voltage input Uin is larger than the sum of the LED voltage of the first LED light string 21 and the second LED light string 22, that is, when Uin>U2, the first switch 311 and the second switch 312 are disconnected, and the third switch 313 is closed, such that the first LED light string 21 and the second LED light string 22 work in series.

When the voltage input Uin is smaller than the LED voltage of the first LED light string 21 or the second LED light string 22, that is, when Uin<U1, the first LED light string 21 and the second LED light string 22 all have no current output. The third switch 313 is disconnected, and the first switch 311 and the second switch 312 is closed.

Referring to FIG. 1, the control unit 30 is a sectional constant current controller having a plurality of active switches. The rectifying module 10 is connected to the electric supply. The rectifying module 10 can be a bridge rectifier structure. There is further a resistor R1 connected in series between the control unit 30 and the rectifying module 10. The resistor R1 is configured to conduct shunting on the LED light strings 20, such that the LED light strings 20 works within a normal current range.

In another embodiment, there is a control unit 30 for an LED driver circuit 100. The LED driver circuit 100 comprises a first LED light string 21 and a second LED light string 22. The control unit 30 comprises a voltage input detection unit (not shown in FIG. 1). The control unit 30 can be a sectional constant current controller having a plurality of active switches. The voltage input detection unit can be an automatic voltage selector control circuit. The voltage input detection unit senses and detects a voltage level of an input signal. The input signal can be an AC sine wave with amplitudes representing different voltage levels.

In some embodiments, the switch assembly 31 is connected to the voltage input detection unit. When the voltage input detection unit determines that the voltage level of the input signal is lower than a predetermined level, the switch assembly 31 connects the first LED light string 21 and the second LED light string 22 in parallel. When the voltage input detection unit determines that the voltage level of the input signal is higher than a predetermined level, the switch assembly 31 connects the first LED light string 21 and the second LED light string 22 in series.

In some embodiments, the predetermined level of the voltage level of the input signal is the sum of the LED voltages of the first LED light string 21 and the second LED light string 22. The switch assembly 31 in this embodiment comprises a first switch 311, a second switch 312, and a third switch 313. When the voltage input detection unit determines that the voltage level of the input signal is larger than the LED voltage of the first LED light string 21 or the second LED light string 22 but smaller than the sum of the LED voltages of the first LED light string 21 and the second LED light string 22, the third switch 313 is disconnected, and the first switch and the second switch are closed, such that the first LED light string 21 and the second LED light string 22 work in parallel.

On the other hand, when the voltage input is larger than another predetermined level (i.e. the sum of the LED voltages of the first LED light string 21 and the second LED light string 22 in this embodiment, but should not be limited in other applications), the first switch 311 and the second switch 312 are disconnected, and the third switch 313 is closed, such that the first LED light string and the second LED light string work in series.

In yet another embodiment, the set of LED light strings can have even number of light strings. For example, a first LED light string, a second LED light string, a third LED light string, and a fourth LED light string, wherein the number of LED light strings should not be limited herein. The even number of LED light strings is set so that each LED light strings of the set of LED light strings can have the same current value passing through them.

Figure 3:
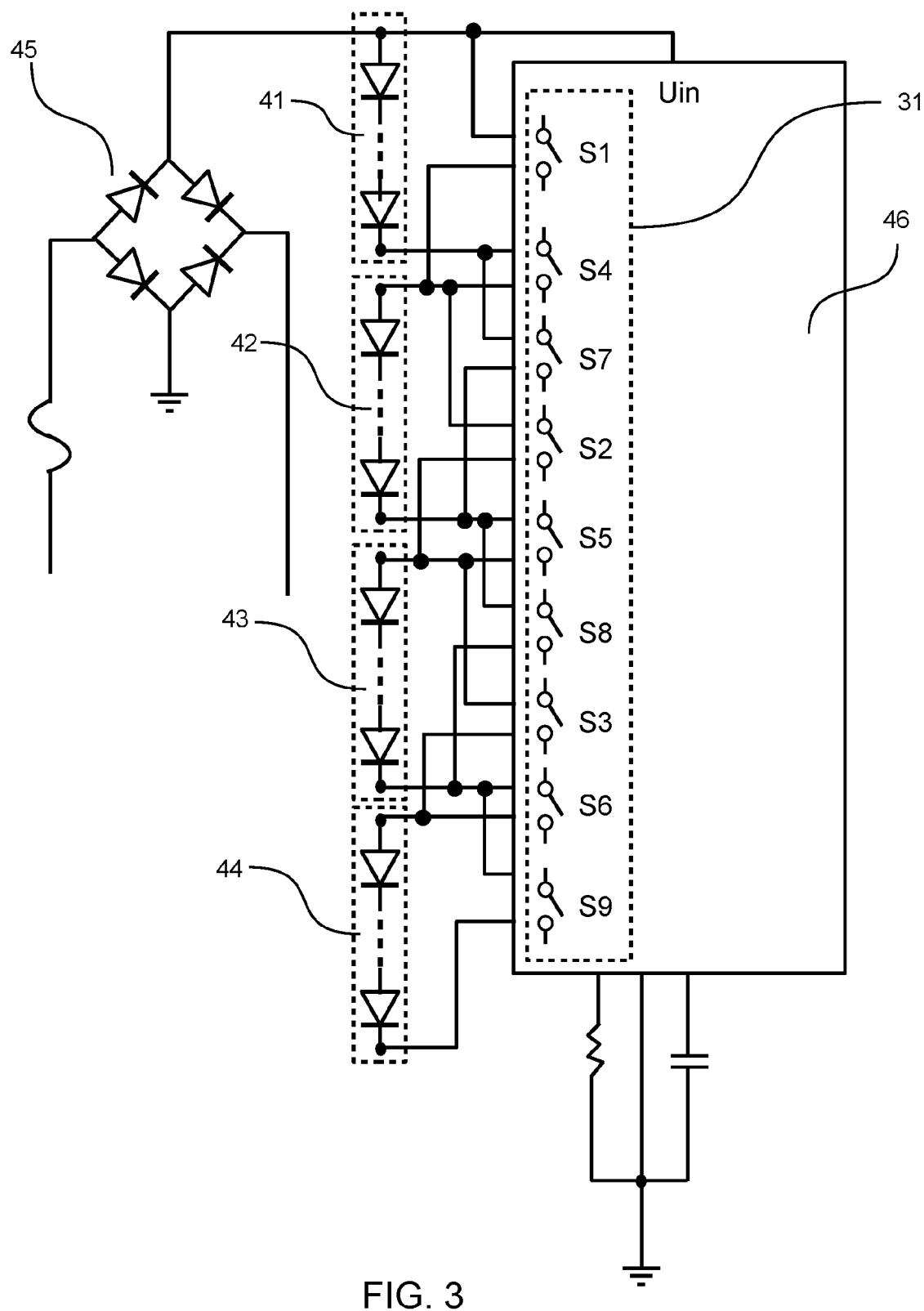
FIG. 3 is an embodiment with four LED light strings and nine switches.

FIG. 3 shows an embodiment of a control unit. In some embodiments, with reference to FIG. 3, the control unit 46 can comprise a switch assembly 31. The switch assembly 31 comprises an odd number of switches, corresponding to the even number of LED light strings. For example, the switch assembly can have a first switch S1, a second switch S2, a third switch S3, a fourth switch S4, a fifth switch S5, a sixth switch S6, a seventh switch S7, an eighth switch S8, and a ninth switch S9. The above mentioned nine switches correspond to the four LED light strings (i.e. the first LED light string 41, the second LED light string 42, the third LED light string 43, and the fourth LED light string 44).

More specifically, in this embodiment, there are three preferred types of connection ways which will be shown as examples. It should be mentioned that the application of the LED driver circuit should not be limited in the three types in the following.

Figure 4:
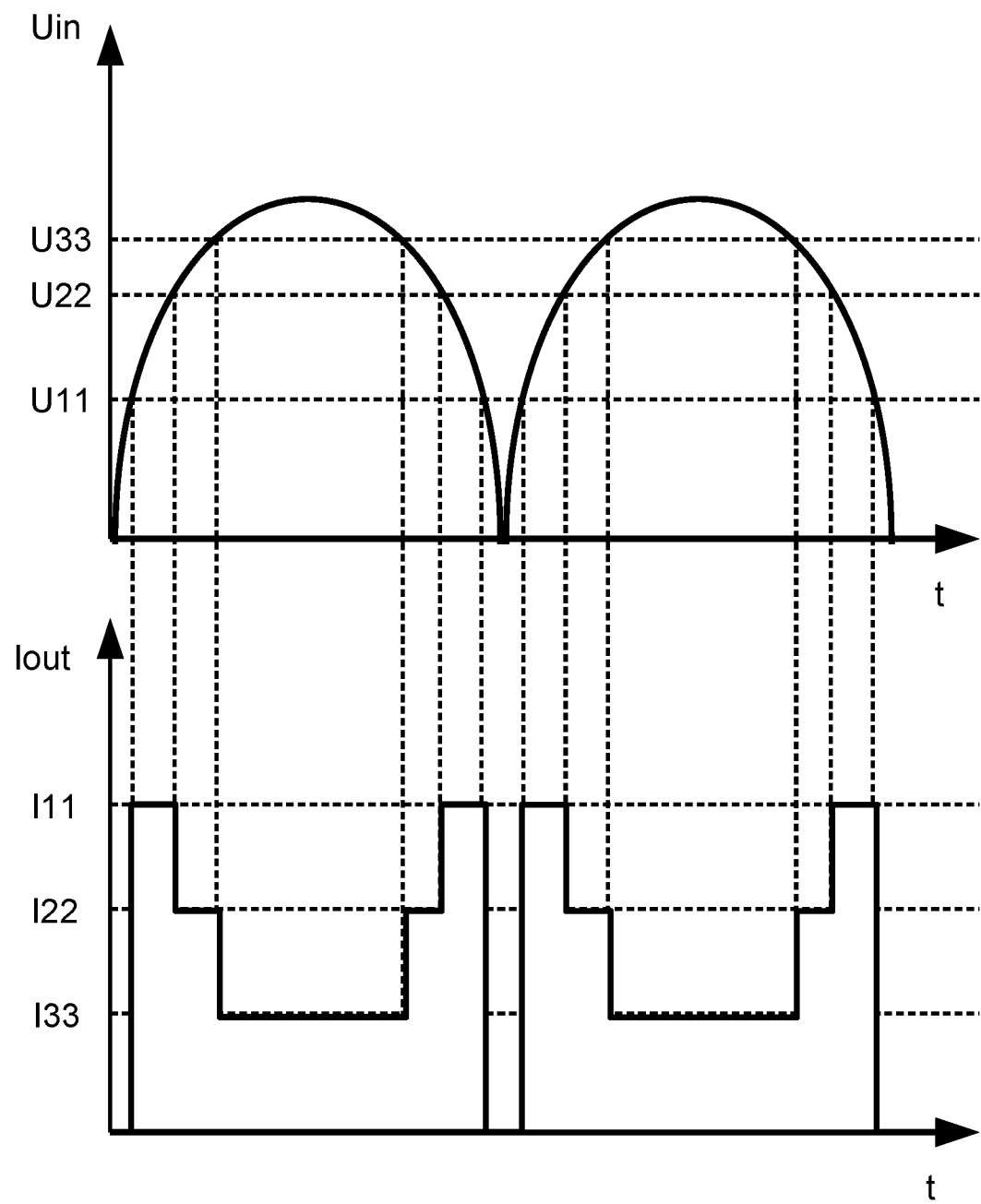
FIG. 4 is a waveform diagram of this embodiment of the invention, illustrating the total currents of the LED light strings varying according to a voltage input Uin.

FIG. 4 is a waveform diagram of this embodiment of the invention, illustrating the total currents of the LED light strings varying according to a voltage input Uin. With reference to FIG. 4, when the voltage input Uin is lower than one of the voltages among the four LED light strings (first, second, third, and fourth LED light strings), which is represented by U11, the sum of currents of all LED light strings is zero. In this case, all switches (from the first switch S1 to the ninth switch S9) are disconnected so that no current passes through any one of the LED light strings.

Next, when the voltage input Uin is larger than U11 but smaller than the sum of two of LED light strings (i.e. the sum of the first LED light string 41 and the second LED light string 42, or the sum of the third LED light string 43 and the fourth LED light string 44 as an example in this embodiment), which is represented by U22, that is, U11<Uin<U22, the switches S4, S5, and S6 are disconnected. The switches S1, S2, S3, S7, S8, and S9 are closed (connected), such that all the LED light strings are connected in parallel. In this case, the sum of currents Iout is I11 as represented in FIG. 4.

Next, when the voltage input Uin is larger than U22 but smaller than the sum of all LED light strings, which is represented by U33, that is, U22<U<U33, the switches S1, S3, S5, S7, and S9 are closed (connected). The switches S2, S4, S6, and S8 are disconnected, such that the first LED string 41 and the second LED string 42 are connected in parallel. The third LED string 43 and the fourth LED string 44 are connected in parallel. The second LED string 42 is further connected to the third LED string 43 in series. In this case, the sum of currents Iout is I22 as shown in FIG. 3, wherein I22<I11.

For the last case, when the voltage input Uin is larger than U33, that is, U>U33, the switches S4, S5, and S6 are connected. The switches S1, S2, S3, S7, S8, and S9 are disconnected. In this case, the sum of currents Iout2 is I33 as represented in FIG. 3, wherein I33<I22<I11.

Figure 5:
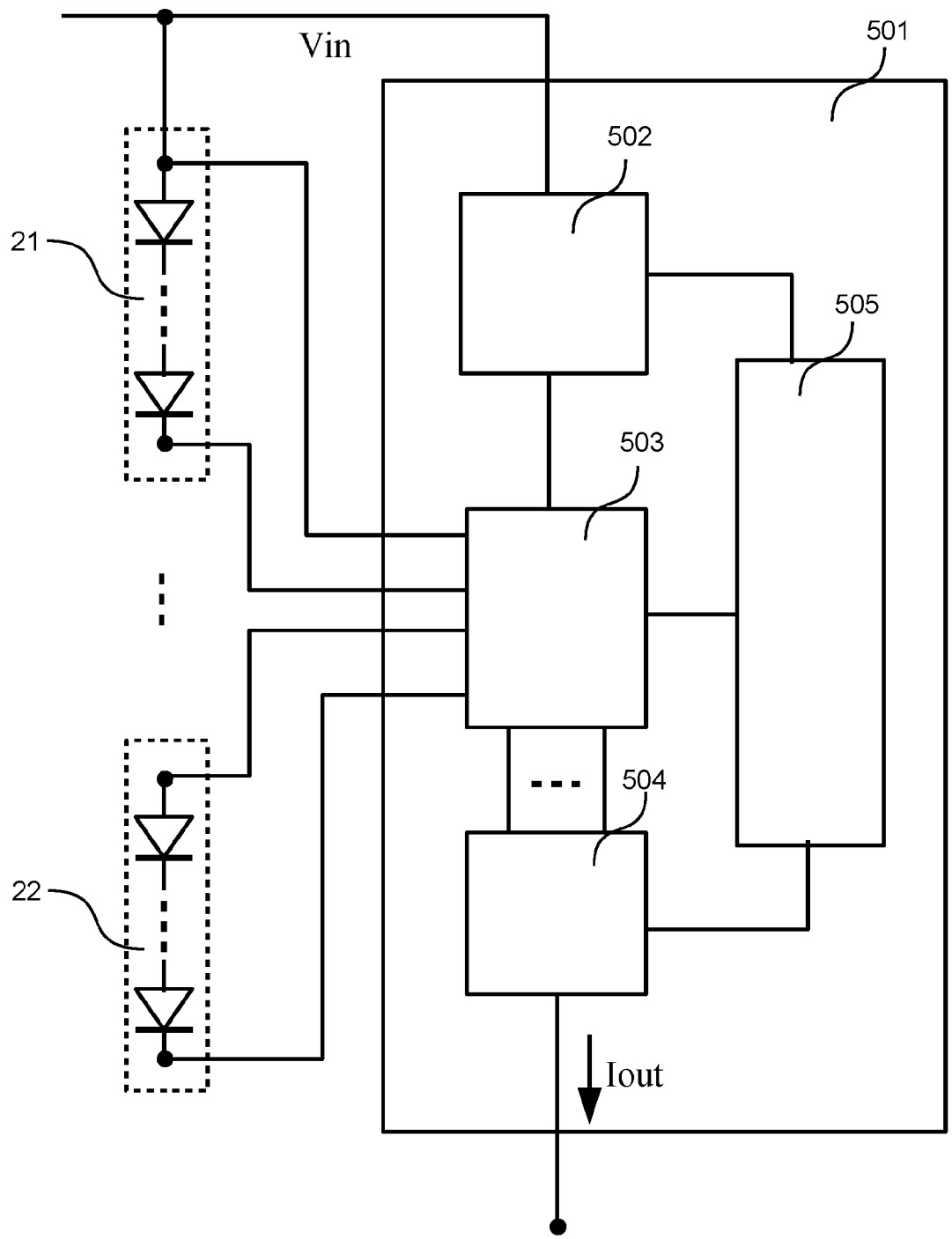
FIG. 5 shows another embodiment of an LED driver.

FIG. 5 shows another embodiment of an LED driver circuit. According to another embodiment, with reference to FIG. 1 and FIG. 5, a control unit 501 for an LED driver circuit 100 comprises a voltage input detection unit 502, and a switch assembly 503. The LED driver circuit comprises a first LED light string 21 and a second LED light string 22. The voltage input detection unit 502 senses and detects a voltage level of an input signal Uin. The switch assembly 503 is connected to the voltage input detection unit 502.

In some embodiments, when the voltage input detection unit 502 determines that the voltage level of the input signal is lower than a predetermined level, the switch assembly 503 connects the first LED light string 21 and the second LED light string 22 in parallel.

When the voltage input detection unit 502 determines that the voltage level of the input signal is higher than the predetermined level, the switch assembly 503 connects the first LED light string 21 and the second LED light string 22 in series. In some embodiments, the predetermined level of the voltage level of the input signal is the sum of the LED voltages of the first LED light string 21 and the second LED light string 22.

In some embodiments, the switch assembly 503 comprises a first switch S1, a second switch S2, and a third switch S3. When the voltage input detection unit 502 determines that the voltage level of the input signal is larger than the LED voltage of the first LED light string 21 or the second LED light string 22 but smaller than the sum of the LED voltages of the first LED light string 21 and the second LED light string 22, the third switch S3 is disconnected, and the first switch S1 and the second switch S2 are connected, such that the first LED light string 21 and the second LED light string 22 work in parallel.

When the voltage input Uin is larger than the predetermined level, the first switch S1 and the second switch S2 are disconnected, and the third switch S3 is connected, such that the first LED light string and the second LED light string work in series. In some embodiments, the control unit 501 comprises a logic circuit 505. In some embodiments, the logic circuit 505 can be replaced by a processor. In some embodiments, the logic circuit 505 can comprise a comparator. The comparator compares the input voltage with a predetermined voltage level and generates a comparison result. The switch assembly 503 can change the way of connection of the LED light strings according to the comparison result. In some embodiments, the switch assembly 503 can change the switch settings for the regulator module 504 so that a total current with a proper current value is generated by the regulator module 504 and a constant current flowing through each LED light string can be maintained. In some embodiments, the switch assembly 503 comprises an odd number of switches. In some embodiments, the control unit 501 further comprises a regulator module 504. The regulator module 504 can comprise a plurality of regulators.

According to another embodiment, with reference to FIG. 1, FIG. 3, and FIG. 5, an LED device 300 comprises a set of LED light strings 41, 42, 43 and 44, a rectifying module 45, and a control unit 46. The control unit 46 can comprise a switch assembly 31. The rectifying module 45 receives an input signal Uin.

The control unit 46 is connected to the set of LED light strings. The control unit 46 is connected to the rectifying module 45. The control unit 46 outputs an output current Iout. The output current Iout comprises at least a portion of currents flowing through the set of LED light strings 41, 42, 43 and 44. In some embodiments, the output current Iout is a total current flowing through the set of LED light strings 41, 42, 43 and 44.

When a voltage level of the input signal Uin is lower than a predetermined level, the output current changes from a first current value to a second current value and at least a subset of the set of LED light strings is connected in parallel.

In some embodiments, the control unit 46 outputs an output current via a current setting output terminal. With reference to FIG. 3 and FIG. 5, in some embodiments, the control unit 46 can be a control unit 501. The output current is set via a regulator module 504. In some embodiments, the control unit 46 has a regulator module for adjusting each LED light string of the set of LED light strings to have the same current value.

In some embodiments, at least a subset of the set of LED light strings is connected in series and a subset of the set of LED light strings is connected in parallel. In some embodiments, the predetermined level of the voltage level of the input signal is one of the LED voltages among the set of LED light strings.

Figure 6:
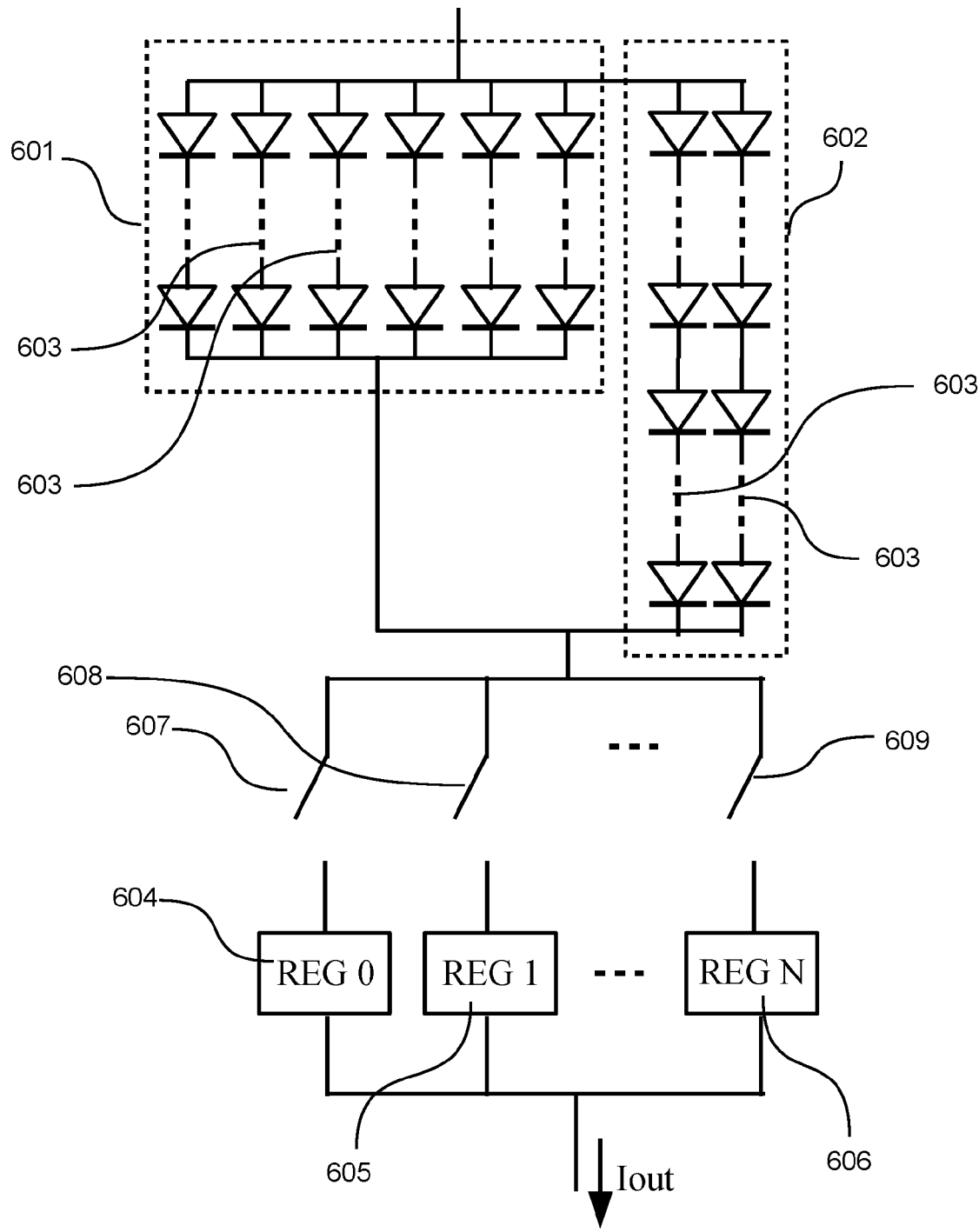
FIG. 6 shows an embodiment of a connection type of LED light strings and corresponding regulators.

FIG. 6 shows an embodiment of a connection type of LED light strings and corresponding regulators. With reference to FIG. 6, a set of LED light strings can be divided into a first subset 601 and a second subset 602. The first subset can comprise a plurality of unit LED light strings 603. In this embodiment, all unit LED light strings 603 in the first subset 601 are connected in parallel. The second subset 602 can comprise a plurality of unit LED light strings 603. In the second subset 602, two unit LED light strings 603 are connected in series, and in turn, the longer LED light strings are connected in parallel. Any possible parallel and serial connections can be implemented by a switch assembly as long as proper switches are provided and are correctly connected. In some embodiments, a third subset and a fourth subset of the LED light strings 603 can be implemented with different type of parallel or serial connections.

In some embodiments, multiple regulators can be implemented to provide proper constant current. For example, a first regulator REG0 604 can provide an unit constant current for a single LED light string 603. Therefore, when all LED light strings 603 are connected in series, the first regulator REG0 604 can be turned on to provide sufficient current and no other regulators are needed. However, when all LED light strings 603 are connected in parallel, more than one regulator may be needed to provide sufficient current. Each branch of the LED light strings 603 needs at least a predetermined amount of constant current. In some embodiments, a regulator REG1 605 can provide twice an unit amount of current. Another regulator REG 606 can provide many times an unit amount of current.

In some embodiments, switches 607, 608, and 609 can be provided to support proper supply of current. The switches 607, 608, and 609 can be implemented in the switch assembly 503 shown in FIG. 5. A total current Iout flows from the selected regulators. The total current Iout is the sum of current flowing through the LED light strings 603.

Figure 7:
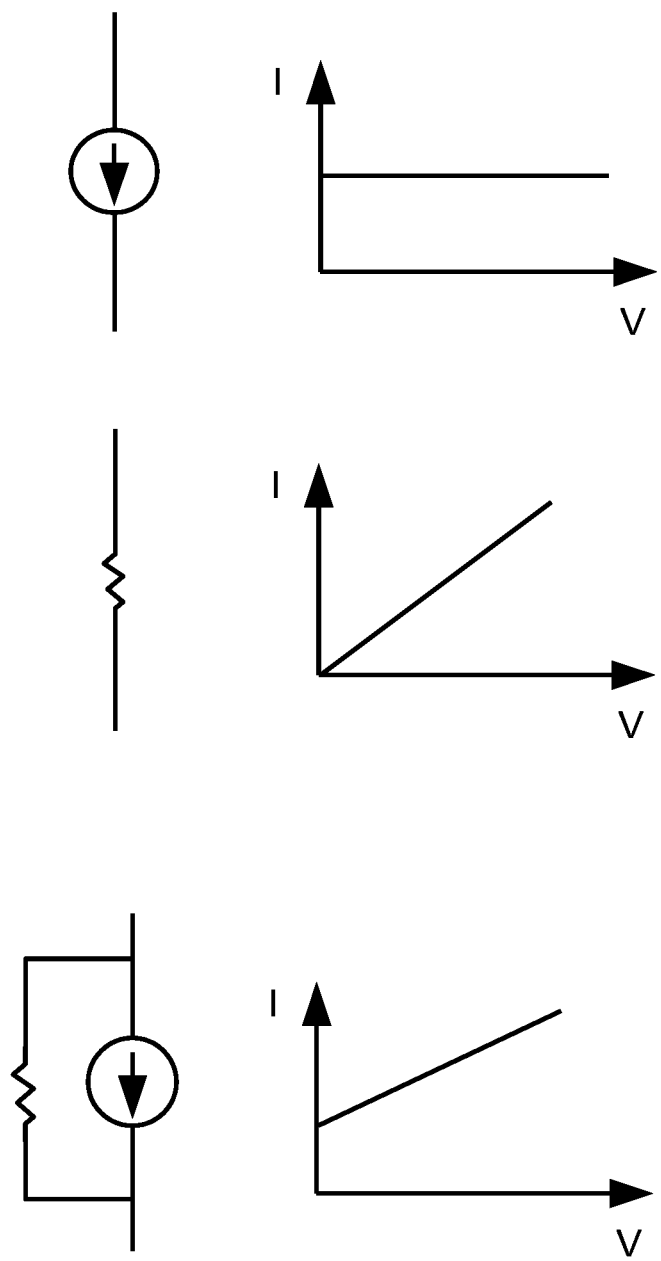
FIG. 7 shows three examples of regulators.
Figure 8:
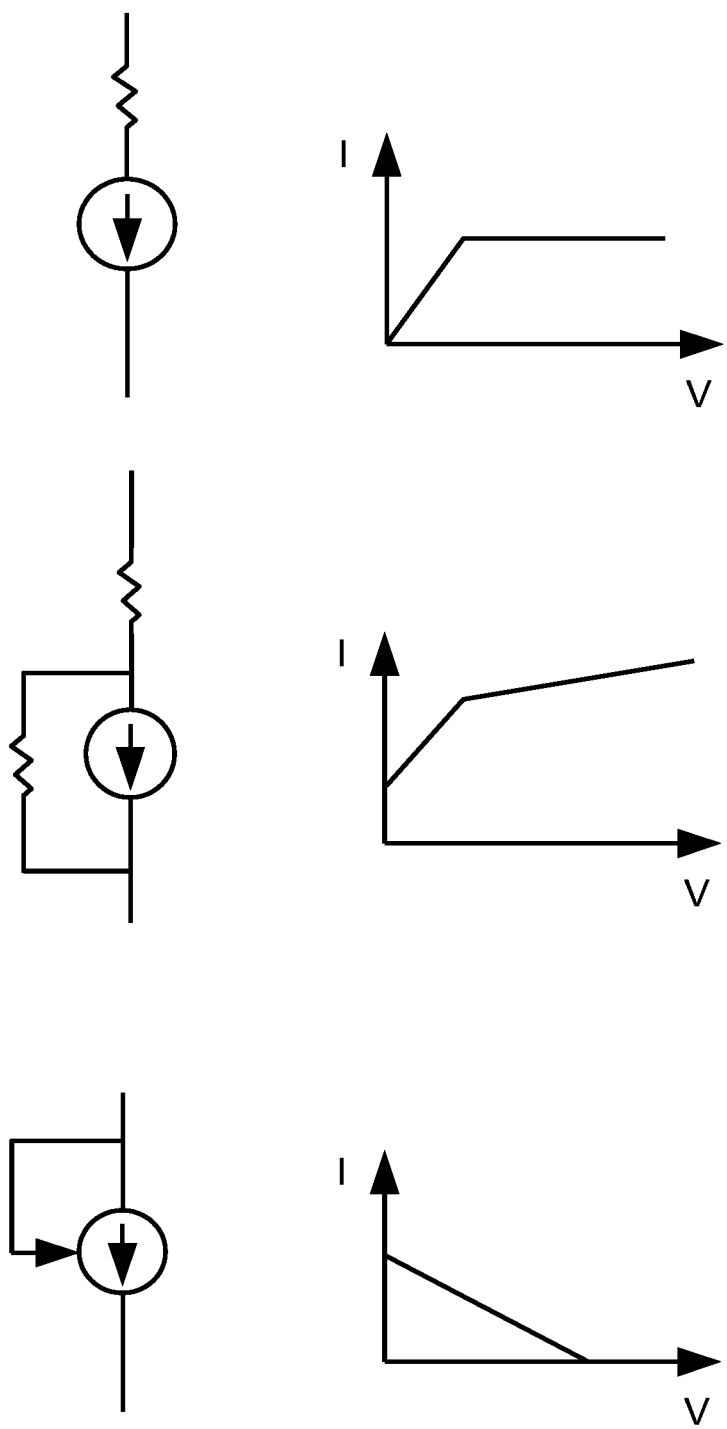
FIG. 8 shows another three examples of regulators.

FIG. 7 shows three examples of regulators. FIG. 8 shows another three examples of regulators. Each of the regulators shown in FIG. 7 and FIG. 8 can be a design choice to implement a proper current source. Each regulator has a corresponding I-V curve to show its characteristics when applying different voltages and currents.

In summary, since the LED driver circuit of the invention does not use electrolytic capacitors, inductors and transformers, but use the newly designed sectional constant current IC such that the serial/parallel relations between each LED light string can be flexibly combined and switched, the space can thus be greatly reduced. The driving circuit is easily miniaturized and the cost be reduced. Since there is no electrolytic capacitor existing in the circuit, the hidden trouble of causing the shortened lifetime of the whole light due to premature failures of electrolytic capacitors is eliminated. The LED driver circuit can thus be used in situations with tightened space with higher requirement to the volume of devices such as MR16 and candle.

What is claimed is:

1. An LED driver circuit, comprising:
a rectifying module;
a control unit; and
at least two strings of LED light strings;
wherein the rectifying module connects to the control unit to input a voltage with periodic variations to the control unit; the control unit comprises a voltage input detection terminal and a switch assembly; the voltage input detection terminal is configured to detect the waveform of the voltage input after rectification by the rectifying module; the switch assembly is connected in series with the LED light strings; and the switch assembly changes the way of connection between the LED light strings according to the waveform of the voltage input, such that the sum of currents of the LED light strings varies corresponding to the variations of the waveform of the voltage input, but the variation ranges of currents of each LED light string flowing through the LED light strings is smaller than the variation range of the voltage, and
wherein when the voltage input for the LED light strings is decreasing, the overall current for the LED strings is increasing step by step, and when the voltage input for the LED light strings is increasing, the overall current for the LED strings is decreasing step by step.

2. The LED, driver circuit as claim 1, wherein when the voltage input is lower, the switch assembly connects the LED light strings in parallel; and when the voltage input is higher, the switch assembly connects the LED light strings in series.

3. The LED driver circuit as claim 1, wherein when the voltage input is lower, the switch assembly shorts at least one LED light strings; and
when the voltage input is higher, the switch assembly connects the LED light strings in series.

4. The LED driver circuit as claim 1, wherein when the voltage input is larger than one of the LED voltages of the LED light strings but smaller than the sum of all the LED voltages of the LED light strings, the switch assembly connects all of the LED light strings in parallel.

5. The LED driver circuit as claim 4, wherein when the voltage input is larger than the sum of all the LED voltages of the LED light strings, the switch assembly connects all of the LED light strings in series.

6. The LED driver circuit as claim 1, wherein the LED light strings comprise a first LED light string and a second LED light string;
the switch assembly comprises a first switch, a second switch, and a third switch;
when the voltage input is larger than the LED voltage of the first LED light string or the second LED light string but smaller than the sum of the LED voltages of first LED light string and the second LED light string, the third switch is disconnected, and the first switch and the second switch are closed, such that the first LED light string and the second LED light string work in parallel; and
when the voltage input is larger than the sum of the LED voltage of the first LED light string and the second LED light string, the first switch and the second switch are disconnected, and the third switch is closed, such that the first LED light string and the second LED light string work in series.

7. The LED driver circuit as claim 6, wherein when the voltage input is smaller than the LED voltage of the first LED light string or the second LED light string, the first LED light string and the second LED light string all have no current output, the third switch is disconnected, and the first switch and the second switch are closed.

8. The LED driver circuit as claim 1, wherein the control unit is a sectional constant current controller having a plurality of active switches.

9. The LED driver circuit as claim 1, wherein the rectifying module is connected to an electric supply, and the rectifying module is a bridge rectifier structure.

10. The LED driver circuit as claim 1, wherein there is further a resistor connected in series between the control unit and the rectifying module, and the resistor is configured to conduct shunting on the LED light strings, such that the LED light strings work within a normal current range.

11. A control unit for an LED driver circuit, the LED driver circuit comprising a first LED light string and a second LED light string, the control unit comprising:

a voltage input detection unit, the voltage input detection unit sensing and detecting a voltage level of an input signal; and a switch assembly, the switch assembly being connected to the voltage input detection unit;

wherein when the voltage input detection unit determines that the voltage level of the input signal is lower than a predetermined level, the switch assembly connects the first LED light string and the second LED light string in parallel; and when the voltage input detection unit determines that the voltage level of the input signal is higher than the predetermined level, the switch assembly connects the first LED light string and the second LED light string in series, and wherein when the voltage input for the LED light strings is decreasing, the overall current for the LED strings is increasing step by step, and when the voltage input for the LED light strings is increasing, the overall current for the LED strings is decreasing step by step.

12. The control unit for an LED driver circuit as claim 11, wherein the predetermined level of the voltage level of the input signal is a sum of the LED voltages of the first LED light string and the second LED light string.

13. The control unit for an LED driver circuit as claim 12, wherein the switch assembly comprises a first switch, a second switch, and a third switch;

wherein when the voltage input detection unit determines that the voltage level of the input signal is larger than the LED voltage of the first LED light string or the second LED light string but smaller than the sum of the LED voltages of the first LED light string and the second LED light string, the third switch is disconnected, and the first switch and the second switch are connected, such the the first LED light string and the second LED light string work in parallel; and when the voltage input is larger than the predetermined level, the first switch and the second switch are disconnected, and the third switch is connected, such that the first LED light string and the second LED light string work in series.

14. The control unit for an LED driver circuit as claim 11, wherein the control unit is a processor.

15. The control unit for an LED driver circuit as claim 11, wherein the switch assembly comprises an odd number of switches.

16. An LED device, comprising
a set of LED light strings;
a rectifying module for receiving an input signal; and
a control unit, the control unit being connected to the set of LED light strings, the control
unit being connected to the rectifying module, the control unit outputting an output current, the output current comprising at least a portion of currents flowing through the set of LED light strings;

wherein when a voltage level of the input signal is lower than a predetermined level, the output current changes from a first current value to a second current value and at least a subset of the set of LED light strings are connected in parallel, and wherein when the voltage input for the LED light strings is decreasing, the overall current for the LED strings is increasing step by step, and when the voltage input for the LED light strings is increasing, the overall current for the LED strings is decreasing step by step.

17. The LED device as claim 16, wherein the control unit outputs an output current via a regulator module.

18. The LED device as claim 16, wherein the control unit has a regulator module for adjusting each LED light string of the set of LED light strings to have the same current value.

19. The LED device as claim 16, wherein at least a subset of the set of LED light strings are connected in series.

20. The LED device as claim 16, wherein the predetermined level of the voltage level of the input signal is a sum of all the LED voltages of the set of LED light strings.

* * * * *